United States Patent Office 3,437,696
Patented Apr. 8, 1969

3,437,696
PROCESS FOR PREPARING PHENOLS
René Victor Julien Achard and Noël Crenne, Lyon, Rhone, France, assignors to Rhone-Poulenc S.A., Paris, France, a corporation of France
No Drawing. Filed Nov. 19, 1964, Ser. No. 412,300
Claims priority, application France, Nov. 22, 1963, 954,709
Int. Cl. C07c *43/20, 39/24, 39/02*
U.S. Cl. 260—613
7 Claims

ABSTRACT OF THE DISCLOSURE

Phenols are prepared by oxidizing a substituted or unsubstituted aromatic hydrocarbon with a hydroperoxide in the presence of boric anhydride, boric acid or a lower alkyl orthoborate and hydrolysing the borate ester of a phenol so produced.

---

This invention relates to the preparation of phenols by oxidizing aromatic compounds.

United States patent specification No. 2,395,638 discloses the oxidation of aromatic hydrocarbons to phenols using a peroxide in an initially anhydrous inert medium in the presence of a small quantity of a metallic oxide giving an unstable peracid rather than a peroxide (e.g. $OsO_4$, $RuO_4$, $V_2O_5$ or $CrO_3$). Benzene has been converted in this manner into phenol in a yield of 22–30% based on the benzene employed, and toluene into cresol in a yield of 30% based on the toluene employed.

Attempts have been made to oxidize alkylbenzenes with tertiary hydroperoxides such as butyl hydroperoxide and cumene hydroperoxide (Chem. Abs., 55, 3509h) in the presence of a mineral base, such as potassium hydroxide, but only the side chains are oxidized, and no formation of phenolic compounds has been observed.

It has now been found that it is possible to oxidize aromatic compounds with organic hydroperoxides in the presence of boric anhydride or another boron compound capable of esterifying a phenol. In the reaction a phenol derived from the aromatic compound employed and an alcohol corresponding to the organic hydroperoxide are simultaneously produced and converted into their boric esters, from which they may thereafter be liberated by hydrolysis. It will, of course, be understood that the aromatic compound to be oxidized must contain at least one nuclear hydrogen atom, and no groups capable of preventing the reaction.

The invention accordingly provides a process for the preparation of a phenol which comprises oxidizing an aromatic compound with an organic hydroperoxide in the presence of a boron compound capable of esterifying the phenol produced, and hydrolysing the borate ester produced.

The aromatic compound may be, for example, an aromatic hydrocarbon, which may be mono- or poly-cyclic, e.g. benzene, toluene, the xylenes, mesitylene, durene, diphenyl, 4-ethyldiphenyl, terphenyl, naphthalene, the methyl-naphthalenes, phenanthrene, and antracene. In addition, substituted aromatic hydrocarbons can be used, especially those in which the substituent is halogen, preferably chlorine, or bromine, hydrocarbonoxy, preferably lower alkoxy or lower alkenoxy, or hydroxyl protected as a borate ester or as an ether with a silanol, in which case the substituent is preferably a tri(lower alkyl) silyloxy group. Other examples of hydrocarbonoxy substituents which may be present in the aromatic compounds oxidized by the new process are cycloalkoxy, aryloxy (e.g. phenoxy), aralkoxy (e.g. benzyloxy), and alkylaryloxy, as well as groups containing a second ether oxygen atom, e.g. alkoxyalkoxy. [The "lower alkyl," "lower alkoxy" and "lower alkenoxy" groups referred to herein each contain a maximum of 4 carbon atoms.]

It will be understood that where the aromatic compound used as starting material contains a hydroxyl group etherified with a silanol, during the hydrolysis of the borate ester formed by the oxidation, the ether group is also hydrolysed, so that the final product is a dihydric phenol. The silanols which can be used may be represented generally by the formula: $HOSiR^1R^2R^3$, where $R^1$, $R^2$ and $R^3$ are the same or different hydrocarbon radicals, such as alkyl, cycloalkyl, aryl or aralkyl, e.g. methyl, ethyl, propyl, cyclopentyl, cyclohexyl, phenyl, benzyl, and chlorophenyl. Specific preferred values of $R^1$, $R^2$ and $R^3$ are: $R^1=R^2=R^3=CH_3$; $R^1=R^2=R^3=C_2H_5$; $R^1=R^2=R^3=C_6H_5$; and $R^1=R^2=CH_3$ and $R^3=C_6H_5$.

Specific examples of aromatic compounds which can be oxidized to phenols by the new process are: chlorobenzene, p-dichlorobenzene, bromobenzene, bromo-diphenyl, aninsole, phenetole, diphenyl oxide, 2-methoxynaphthalene, allyloxybenzene, the dimethoxybenzenes, o- and p-chloroanisole, o- and p-bromoanisole, o- and p-chlorophenetole, o- and p-bromophenetole, phenol, the cresols, the chlorophenols, the bromophenols, the chlorocresols, and dibenzyl oxide. [It will be understood that compounds containing a hydroxyl group are oxidized as their borate esters or silanol ethers, as mentioned above.]

Thus the process of the invention is especially valuable as applied to the compounds of the formula:

$$C_6H_5-R$$

where R is hydrogen, halogen, lower alkyl, lower alkoxy, lower alkenoxy, $-OB(OC_6H_5)_2$, or $-O-Si(lower alkyl)_3$. In particular, the new method is valuable for converting anisole into guaiacol.

The organic hydroperoxide used in the oxidation may be primary, secondary or tertiary, aliphatic, aromatic or cycloaliphatic. Among primary and secondary hydroperoxides, benzyl hydroperoxide, cyclohexyl hydroperoxide and ethyl-benzene hydroperoxide are preferred. The preferred tertiary hydroperoxide is cumene hydroperoxide. Other operable hydroperoxides include t-butyl hydroperoxide, methylcyclohexyl hydroperoxide, and the hydroperoxides of tetra- and deca-hydronaphthalene. These compounds are exemplary of unsubstituted hydrocarbon hydroperoxides having from 4 to 10 carbon atoms.

The reaction is conveniently carried out in solution in excess of the aromatic compound to be oxidized, and the weight of hydroperoxide used is preferably 1 to 30%, and especially 1 to 10%, of the weight of the aromatic compound. The use of such a reaction medium tends also to diminish the formation of unwanted highly oxidized by-products.

It is generally advantageous, especially when the hydroperoxide used is tertiary, to carry out the oxidation in the presence of a small amount of an amine, which has the effect of decreasing the tendency of the hydroperoxide to decompose before reacting with the aromatic compound. For example, cumene hydroperoxide reacts, in the process of the invention, with toluene to produce cresol and phenylisopropanol, but can also decompose directly to give phenol and acetone. The latter reaction is depressed by the presence of amine.

The amine used may be a primary, secondary, tertiary, or quaternary ammonium base, and may be aliphatic, cycloaliphatic, or heterocyclic. Examples of suitable amines include especially pyridine, piperazine, and triethylamine, and also the other ethylamines, the butylamines, monolaurylamine, cyclohexylamine, piperidine, the ethanolamines and diethylethanolamine. Functional groups may be present in the amines used provided they do not interfere with the oxidation or the working up of the reaction mixture. The amount of amine is ordinarily 0.0001 to 0.2 mole per mole of hydroperoxide, preferably 0.0001 to 0.001 to 0.05. If more than 0.2 mole is used the rate of oxidation may become rather slow.

The boron compound capable of esterifying the phenol produced is preferably boric anhydride, boric acid, or a lower alkyl orthoborate, e.g. methyl borate. The last esterifies the phenol by a transesterification reaction with liberation of the lower alkanol. The mole ratio of boron compound to hydroperoxide initially present in the reaction mixture is preferably between 0.1 and 5. Alternatively, the amount of boron compound used may be calculated to provide from 1/3 to 20 atoms of boron per molecule of hydroperoxide. In any case, enough boron compound should be present to esterify all the phenol produced by the oxidation.

The best conditions and concentrations to use in carrying out the new process naturally depend on the precise nature of the reagents employed. Generally speaking, the reaction temperature and time depend on the stability of the hydroperoxide used, the greater the latter, the longer the time and the higher the temperature. Naturally also, the ease with which the aromatic compound is oxidized affects the reaction conditions. Ordinarily, a temperature between 50° and 150° or 180° C. is preferred, and the reaction time is from 1 to 10 hours.

The process may be carried out by introducing the reactants, including the amine (if any), into a vessel such as a round-bottomed flask provided with a reflux condenser; or an autoclave, and the mixture is then heated until the hydroperoxide is completely decomposed. If desired, the hydroperoxide may be added to a preheated mixture of the other reactants, or only a part of the boron compound may be introduced at the beginning of the process, the remainder being gradually added as the reaction proceeds.

When the aromatic compound to be oxidized is a phenol, it may be converted into its borate immediately before the oxidation by the action of a boron compound (for example methyl borate) on the phenol, the quantity of boron compound used including that necessary for the oxidation. The other reagents are then added and the reaction continued in the same manner as with other starting materials.

The reaction mixture produced by the new process includes the excess of the initial aromatic compound, the desired phenol (as its borate ester) and, in a quantity varying with the reactants and the operation conditions, oxidation products of the alcohol derived from the hydroperoxide, and secondary decomposition products of the hydroperoxide (e.g. phenol and acetone in the case of cumene hydroperoxide). Hydroxy compounds derived from these secondary reactions are naturally also in the form of their borate esters. When the reaction is complete, the mixture may be heated in the presence of water to hydrolyse the borate esters present. The boric acid so formed generally crystallises, and is conveniently separated by filtration and washed with an organic solvent. From the organic layer, the phenols may be extracted with an aqueous alkali metal hydroxide, when the alcohol and its oxidation products, if any, derived from the hydroperoxide remain in the organic layer. They may be separated therefrom by distillation. The phenols are liberated from the aqueous alkaline solution by acidification and acidification and extraction. The unoxidized portion of aromatic compound may be recycled.

If desired, when the oxidation is complete, what remains of the initial boron compound may be separated and part of the aromatic compound which has not been oxidized may be distilled, and the hydrolysis of the phenol borates and the alcohols with the subsequent steps described above may be effected on the residue.

The oxidation in the process of the invention takes place in accordance with the usual rules for the orientation of substituents. When the aromatic hydrocarbon is substituted by a hydrocarbon radical or other group, a mixture of isomeric phenols is generally obtained.

The following examples illustrate the invention.

EXAMPLE 1

Into a three-necked round-bottomed 500-cc. flask provided with a mechanical stirrer, a dropping funnel, a thermometer tube and a reflux condenser are charged 7 g. of boric anhydride (0.1 mole) and 181 g. of toluene. The mixture is heated under reflux (109° C.) and, while stirring is continued, 129 g. of a solution in toluene of benzyl hydroperoxide having a concentration of 4.93% by weight of hydroperoxide, i.e. 0.0513 mole of hydroperoxide, are rapidly added. The heating is continued under reflux until the benzyl hydroperoxide has completely disappeared, which takes 3 hours, 30 minutes. After cooling, the excess of boric anhydride and the boric acid formed are filtered off, and the filtrate is heated at 85–90° C. for 2 hours in the presence of 30 cc. of water. The boric acid, derived from the hydrolysis of the boric esters, is filtered off, and the aqueous and toluene layers formed are separated. The toluene layer is then treated successively with 4× 30 cc. of aqueous sodium carbonate solution (100 g./l.) to eliminate acid impurities, and then extracted 5 times, with 30 cc. of aqueous sodium hydroxide solution (135 g./l.) each time. These extracts are combined and acidified with 6 N hydrochloric acid. The liberated cresols are then extracted with 5× 50 cc. of diethyl ether, and the ethereal layers are combined and dried over anhydrous sodium sulphate. On evaporation of the ether, there are obtained 3.38 g. (0.0313 mole) of a mixture of o- and p-cresol, containing 75% of o-cresol. The molar yield is 61.2% calculated on the benzyl hydroperoxide employed.

The toluene fraction remaining from the alkaline extraction is then neutralised with 10 cc. of an aqueous acetic acid solution of 2% concentration by weight and washed with 2× 10 cc. of water. After drying and concentration to 20 g. by distillation at 30° C. under 30 mm. Hg, a fraction is obtained containing 4.05 g. of benzyl alcohol, i.e. a molar yield of 73.3%, calculated on the hydroperoxide employed.

EXAMPLE 2

Into an apparatus identical with that of the preceding example, but having a capacity of 1 litre, are introduced 12 g. of boric anhydride (0.173 mole), 393 g. of toluene and 107 g. of a solution in toluene of cyclohexyl hydroperoxide having a concentration of 9.35% by weight of hydroperoxide, i.e. 0.0862 mole of hydroperoxide. The mixture is heated under reflux (108° C.) for 3 hours. The hydrolysis and separation of the products are then carried out as in the preceding example. 5.52 g. of a mixture of o- and p-cresols (titrating 75% of o-cresol) and 6.9 g. of cyclohexanol are thus obtained, which represents a molar yield of 59.2% of cresols and 80% of cyclohexanol, calculated on the cyclohexyl hydroperoxide employed.

EXAMPLE 3

Into an apparatus identical with that of Example 1 are introduced 6.8 g. of boric anhydride (0.098 mole) and 109 g. of a benzyl hydroperoxide solution in benzene in a concentration of 5.5% by weight (6 g. of pure hydroperoxide, i.e. 0.0484 mole), and the mixture is then heated for 6 hours under reflux (82° C.). The treatments of hydrolysis and separation of the products are then carried out as in Example 1. 1.01 g. of phenol, 1.76 g. of benzyl alcohol, and 0.85 g. of benzaldehyde (derived from the decomposition of the hydroperoxide) are thus obtained, i.e. 22.2 moles of phenol, 33.8 moles of benzyl alcohol and 16.5 moles of benzaldehyde, respectively, for each 100 moles of benzyl hydroperoxide employed.

EXAMPLE 4

Into a 100-cc. stainless steel autoclave provided with a stirrer, are introduced 10.3 g. of boric anhydride (0.148 mole), 318 g. of benzene and 112.5 g. of a cyclohexyl hydroperoxide solution in benzene in a concentration of 7.65% by weight of hydroperoxide, i.e. 0.074 mole of hydroperoxide. The autoclave is purged with nitrogen and heated at 150° C. under a nitrogen pressure of 10 bars for 2 hours, 30 minutes. After the usual hydrolysis and isolation treatments 2.16 g. of phenol, 3.3 g. of cyclohexanol, and 0.9 g. of cyclohexanone are obtained, i.e. 31 moles of phenol, 44.5 moles of cyclohexanol and 12.4 moles of cyclohexanone, respectively, for each 100 moles of cyclohexyl hydroperoxide employed.

EXAMPLE 5

Into a round-bottomed 250-cc. flask equipped in the same manner as that of Example 1 are introduced 7 g. of boric anhydride (0.1 mole) and 35 g. of toluene, and the mixture is then heated under reflux (111° C.). 86 g. of an ethylbenzene hydroperoxide solution in toluene in a concentration of 8.03% (i.e. 0.05 mole of ethylbenzene hydroperoxide or 6.9 g.) are then added in one hour at this temperature, and the mixture is further heated for 2 hours at 110° C.

After cooling, the excess of boric anhydride is filtered, the filtrate is heated for 2 hours at 88–90° C. in the presence of 30 cc. of water, and the products obtained are isolated by the procedure described in the foregoing examples. 1.35 g. of cresols, 0.45 g. of phenol, 1.61 g. of α-phenylethyl alcohol and 0.175 g. of acetophenone are thus obtained, i.e. 25 moles of cresols, 26.4 moles of α-phenylethyl alcohol, 2.9 moles of acetophenone, and 9.6 moles of phenol for each 100 moles of ethylbenzene hydroperoxide employed.

EXAMPLE 6

Into a 500-cc. stainless steel autoclave provided with a shaker-type stirrer are introduced 6.45 g. of boric anhydride (0.0920 mole), 112 g. of toluene and 0.0126 g. of pyridine. The autoclave is purged with nitrogen and heated while a nitrogen pressure of 5 bars is maintained. When the temperature reaches 165° C., 138 g. of a solution in toluene of cumene hydroperoxide in a concentration of 4.86% by weight of hydroperoxide, i.e. 0.044 mole, are rapidly introduced into the autoclave. The injection is terminated by rinsing with 100 g. of toluene. The heating is then continued at 150–165° C. for 3 hours, 30 minutes. After cooling, a phenolic fraction (2.15 g.) consisting of 0.5 g. of phenol derived from the decomposition of cumene hydroperoxide and 1.65 g. of a mixture of o- and p-cresols derived from the oxidation of the toluene is separated by the procedure described in the preceding examples, giving molar yields of 12% of phenol and 35% of cresols calculated on the hydroperoxide employed.

If the experiment is repeated without pyridine, the oxidation of toluene cresols takes place in a molar yield of only 17%, while the quantity of phenol formed by decomposition of the hydroperoxide is 22%.

EXAMPLE 7

Into a 10-litre round-bottomed flask equipped as in Example 1, are introduced 68.8 g. of boric anhydride (0.990 mole), 990 g. of a toluene solution containing 6.88% by weight of ethyl-benzene hydroperoxide (i.e. 68.2 g. of pure hydroperoxide, or 0.494 mole), 2420 g. of toluene, and 0.12 g. of pyridine. (The reaction mixture thus contains 2% of the hydroperoxide in solution in toluene.) The mixture is heated for 6 hours under reflux (110° C.) and with stirring. After-working up as in the preceding examples, 34.6 g. of a mixture of cresols (26.3 g. of ortho-isomer to 8.3 g. of para-isomer) are obtained.

The toluene solution which contains the products of decomposition of the hydroperoxide is neutralised with 50 cm.³ of an aqueous acetic acid of 2% concentration by weight, and then washed with 2× 100 cc. of water, dried and concentrated to 180 g. by distillation under atmospheric pressure. These 180 g. contain 50.45 g. of α-phenylethyl alcohol, and 1.29 g. of acetophenone.

For 100 moles of ethylbenzene hydroperoxide employed, there are thus finally obtained: 49.3 moles of o-cresol, 15.5 moles of p-cresol, 84 moles of α-phenylethyl alcohol, and 2.2 moles of acetophenone, a total of 151.0 moles of oxygenated compounds.

EXAMPLE 8

Into a 3-litre round-bottomed flask equipped as in Example 1 are introduced. 28.4 g. of boric anhydride (0.407 mole), 743 g. of benzyl hydroperoxide in solution in toluene in a concentration of 3.4% (i.e. 25.22 g. of pure hydroperoxide, or 0.2035 mole), 517 g. of toluene, and 0.264 g. of pyridine. The mixture is heated for 4 hours, 10 minutes under reflux (110° C.) and with stirring. After treatment as in the preceding examples, there are obtained 14.45 g. of a mixture of cresols (10.7 g. of o-cresol and 3.75 g. of p-cresol) and a residual toluene solution containing 18.78 g. of benzyl alcohol and 1.19 g. of benzaldehyde.

For 100 moles of benzyl hydroperoxide employed, there are thus finally obtained: 48.6 moles of o-cresol, 17.1 moles of p-cresol, 85.3 moles of benzyl alcohol, and 5.5 moles of benzaldehyde, a total of 156.5 moles of oxygenated compounds.

EXAMPLE 9

Into the same apparatus as in Example 1 are introduced 7.3 g. of boric anhydride (0.105 mole), 304 g. of a cyclohexyl hydroperoxide solution in toluene in a 2% concentration by weight (i.e. 6.08 g. of pure hydroperoxide, or 0.0524 mole), and 0.084 g. of pyridine. The mixture is then heated for 4 hours under reflux (110° C.) and with stirring. After treatment as in the preceding examples, there are obtained 3.37 g. of a mixture of ortho and para-cresols (in a molar ratio of about 75/25), and a residual toluene solution containing 4.64 g. of cyclohexanol and traces of cyclohexanone.

For 100 moles of cyclohexyl hydroperoxide employed, there are thus finally obtained: 59.6 moles of cresols and 88.5 moles of cyclohexanol.

EXAMPLE 10

Into a 1000-cc. round-bottomed flask provided with a central stirrer, a thermometer, a dropping funnel and a rectification column are introduced: 17.8 g. of ortho-boric acid (0.288 mole), 200 g. of a benzyl hydroperoxide solution in toluene in a concentration of 4.46% (i.e. 8.92 g. of pure hydroperoxide, or 0.072 mole), 245 g. of toluene, and 0.230 g. of pyridine. The mixture is then heated with stirring for 3 hours, 45 minutes at 109° C. Throughout the heating, the water formed by the reaction is eliminated by distilling off the binary water-toluene azeotrope (total volume distilled is 175 cc.), while a total of 100 cc. of toluene is introduced through the dropping funnel. After working up as in the preceding examples, 4.65 g. of a mixture of ortho- and para-cresols (in a mole ratio of about 75/25) and a residual toluene solution containing 6.92 g. of benzyl alcohol and 0.812 g. of benzaldehyde are obtained.

For 100 moles of benzyl hydroperoxide employed, there are thus finally obtained 60 moles of cresols, 89 moles of benzyl alcohol, and 10.7 moles of benzaldehyde.

EXAMPLE 11

Into the same apparatus as in Example 1 are introduced 4.94 g. of boric anhydride (0.0710 mole), 100 g. of an ethylbenzene hydroperoxide solution in toluene in a concentration of 4.89% (i.e. 4.89 g. of pure hydroperoxide or 0.0355 mole), 145 g. of toluene, and 0.09 g. of anhydrous piperazine, and the mixture is then heated for 11 hours under reflux and with stirring. After working-up as in the preceding examples, 1.95 g. of a mixture of ortho- and para-cresols (about 75/25) containing traces of phenol are obtained. The residual toluene solution contains 3.82 g. of α-phenylethyl alcohol and 0.335 g. of acetephenone.

For 100 moles of ethylbenzene hydroperoxide employed, there are thus finally obtained 51 moles of cresols, 88 moles of α-phenylethyl alcohol, and 7.9 moles of acetophenone.

EXAMPLE 12

Into the same apparatus as in Example 1 are introduced 4.76 g. of boric anhydride (0.0684 mole), 96.5 g. of an ethylbenzene hydroperoxide solution in toluene in a concentration of 4.89% (i.e. 4.72 g. of pure hydroperoxide, or 0.0342 mole), 140 g. of toluene, and 0.0751 g. of triethylamine. After heating at 110° C. for 7 hours, 30 minutes and working-up as in the preceding example, there are obtained 1.64 g. of a mixture of ortho- and para-cresols (in a mole ratio of about 75/25) containing traces of phenol. The toluene solution remaining after the extraction with sodium hydroxide contains 3.32 g. of α-phenylethyl alcohol and 0.63 g. of acetophenone.

For 100 moles of ethylbenzene hydroperoxide employed, there are thus finally obtained 44.3 moles of cresols, 79.6 moles of α-phenylethyl alcohol, and 15.4 moles of acetophenone.

EXAMPLE 13

Into the same apparatus as in Example 1 are introduced 6.8 g. of boric anhydride (0.097 mole), and 311 g. of a benzyl hydroperoxide solution in anisole in a concentration of 1.94% by weight (i.e. 6.03 g. of pure benzyl hydroperoxide, or 0.0486 mole), and the mixture is then heated with stirring at 110° C. for 2 hours, 30 minutes. The excess of boric anhydride and the boric acid formed are then filtered off, the residue is washed on the filter with benzene (2× 30 cc.), 30 cc. of water are added to the filtrate, and the latter is then heated for 2 hours at 80° C. After cooling to 20° C., the boric acid derived from the hydrolysis of the boric esters is filtered off and washed on the filter with benzene (2× 30 cc.). The aqueous layer is separated and the organic solution is washed with 5× 30 cc. of aqueous sodium bicarbonate solution in a concentration of 5% by weight. These aqueous extracts are combined and washed with benzene (3× 50 cc.).

The organic solution, containing the benzene washings, is extracted with 5× 30 cc. of aqueous sodium hydroxide in a concentration of 125 g./l. The extracts are combined and washed with benzene (2× 50 cc.) and then acidified with 6 N hydrochloric acid. The acidified mixture is extracted with 6× 50 cc. of benzene, and the benzene extracts are dried over sodium sulphate, and the benzene is evaporated. 4.6 g. of a mixture of methoxyphenols (about 3 parts of guaiacol to 1 part of para-methoxyphenol), i.e. 0.0371 mole, are thus obtained.

The organic solution remaining from the preceding alkaline extraction is neutralised with 10 cc. of aqueous acetic acid solution of 2% concentration by weight, washed with 10 cc. of water, dried and concentrated to 48.2 g. by distillation at up to 66° C. under 35 mm. Hg. The concentrated fraction obtained contains 4.52 g. of benzyl alcohol and 0.315 g. of benzaldehyde.

Thus for 100 moles of benzyl hydroperoxide employed, there are obtained 76.5 moles of methoxyphenols, including about 60 moles of guaiacol, 86 moles of benzyl alcohol, and 6.15 moles of benzaldehyde.

EXAMPLE 14

By proceeding as in Example 13, starting from a mixture of 134 g. of boric anhydride (1.92 mole), 2789 g. of anisole and 2786 g. of a 4%-by-weight solution of cyclohexyl hydroperoxide in anisole (i.e. 0.961 mole of hydroperoxide), 98 g. of a mixture of methoxyphenols (i.e. 0.79 mole, consisting of 66% of guaiacol and 33% of p-methoxyphenol) are obtained, i.e. a molar yield of methoxyphenols of 82.5% calculated on the cyclo hexyl hydroperoxide employed, including 55% of guaiacol.

EXAMPLE 15

The procedure of Example 13 is followed, but starting from 7.4 g. of boric anhydride (0.106 mole), 331.5 g. of a benzyl hydroperoxide solution in phenetole in a concentration of 2.06% by weight (i.e. 6.83 g. of benzyl hydroperoxide, or 0.055 mole), and 0.135 g. of pyridine The mixture is heated for 4 hours, 10 minutes at 116° C. After the usual working-up treatments, 4.49 g. of ethoxyphenols (about 3 parts of ortho- to 1 part of paraethoxyphenol), i.e. 0.0326 mole, are obtained.

For 100 moles of benzyl hydroperoxide employed, there are thus obtained 59 moles of ethoxyphenols, including about 45 moles of the ortho isomer.

EXAMPLE 16

The procedure of Example 13 is followed, but starting from 12.6 g. of boric anhydride (0.181 mole), 175.4 g. of a cyclohexyl hydroperoxide solution in allyloxybenzene in a concentration of 6% by weight (i.e. 10.5 g. of cyclohexyl hydroperoxide, or 0.0905 mole), and 0.142 g. of pyridine. The mixture is heated for 2 hours at 110° C. and, after the usual working-up treatments, 5 g. of a mixture of ortho- and para-(allyloxy)phenols, i.e. 0.0334 mole, or 37 moles of allyloxyphenols per 100 moles of cyclohexyl hydroperoxide employed are obtained.

EXAMPLE 17

The procedure of Example 13 is followed, but starting from 7.65 g. of boric anhydride (0.109 mole), 343.7 g. of a benzyl hydroperoxide solution in chlorobenzene in a concentration of 1.98% by weight (i.e. 6.8 g. of pure hydroperoxide, or 0.0548 mole), and 0.092 g. of pyridine. After heating for 13 hours, 30 minutes and the usual working-up treatments, 1.41 g. of chlorophenols (in a ratio of 1.25 part by weight of ortho-isomer to 1 part by weight of para-isomer), or 0.011 mole, are obtained. 20 moles of chlorophenols are thus obtained per 100 moles of hydroperoxide employed.

EXAMPLE 18

Into a 10-litre, round-bottomed flask provided with a central stirrer, a 250-cc. dropping funnel and a distillation column are introduced 51 g. (0.44 mole) of cyclohexyl hydroperoxide in solution in 2307 g. of anisole and 250 cc. of methyl orthoborate. The reaction mixture is heated at 130–140° C. for one hour and 125 cc. of methyl borate are added drop-by-drop during the heating.

In the course of the heating, the methanol formed is eliminated by distillation of the methanol/methyl borate azeotrope. The excess of methyl borate is finally eliminated by distillation under normal pressure, and the unconverted anisole by distillation under reduced pressure at up to 80° C. for 2 hours under a vacuum of 1–2 mm. Hg, to eliminate any remaining volatile borates. After cooling, the reaction mass is heated at 80° C. in the presence of 100 cc. of water for 2 hours, and then allowed to cool. The precipitated boric acid is filtered off and the aqueous layer of the filtrate is extracted with 3× 100 cc. of diethyl ether. The ethereal extracts are combined with the organic layer of the filtrate and the mixture is extracted seven times with 100 cc. of 10% aqueous sodium hydroxide solution. The aqueous extracts are combined and acidified with 6 N hydrochloric acid (500 cc.). The liberated phenolic compounds are then extracted with 7× 200 cc. of ether, and then ethereal extracts are combined, washed with 5× 30 cc. of a saturated aqueous sodium bicarbonate solution, and dried over anhydrous sodium sulphate. After evaporation of the ether, 31.7 g. of a mixture of o- and p-methoxyphenols are obtained, containing 2 parts of ortho-methoxyphenol to 1 part of paramethoxyphenol, i.e. a molar yield of 58 moles of methoxyphenols per 100 moles of hydroperoxide employed.

The organic fraction remaining after the sodium hydroxide extractions is washed with 3× 10 cc. of 5% aqueous acetic acid solution, and with 10 cc. of water, and then dried over anhydrous sodium sulphate. After evaporation of the ether, 38 g. of cyclohexanol, i.e. a molar yield of 86.5% calculated on the hydroperoxide employed, are obtained.

EXAMPLE 19

A mixture consisting of 367 g. of anisole, 83.2 g. of a 12% cumene hydroperoxide solution in anisole, and 0.01 g. of pyridine is refluxed (at a temperature 149° C.). 9.2 g. of boric anhydride and 50 g. of anisole are then added and the heating is continued at 150° C. for 2 hours, 20 minutes. After the usual working-up treatments, 5.46 g. of phenolic products, containing 0.8 g. of phenol, 3.41 g. of guaiacol and 1.24 g. of p-methoxyphenol, are finally obtained, a molar yield of 57% of methoxyphenols calculated on the hydroperoxide employed.

EXAMPLE 20

Into a three-necked, round-bottomed 1000-cc. flask provided with a central stirrer, a dropping funnel and a distillation column on which is mounted an analyser, above which is a condenser, are introduced 47 g. of phenol (0.5 mole) and 52 g. of methyl borate (0.5 mole). The mixture is heated under reflux (90–100° C.), and the methyl alcohol is distilled as it is formed as an azeotrope with the methyl borate, while 77 g. (0.74 mole) of methyl borate are slowly added during the heating (1 hour, 30 minutes). The temperature of the reaction mass at the end of the distillation is 115° C. 16.8 g. of cyclohexyl hydroperoxide (0.145 mole) in solution in 121 g. of methyl borate (1.16 mole) are then added through the dropping funnel. The mixture is heated under reflux for 4 hours until the azeotrope ceases to distil. The reaction mixture is then cooled to 60° C. and the excess of methyl borate is distilled under a slight vacuum. The residual mass is hydrolysed with 100 cc. of water for 2 hours at 80–85° C. After cooling, the boric acid formed is separated by filtration and washed on the filter with 10 × 50 cc. of diethyl ether. The ethereal layer is separated from the filtrate and washed with aqueous sodium bicarbonate solution, and then extracted with aqueous sodium hydroxide solution containing 135 g. of NaOH per litre. After acidification of the alkaline extract with 6 N hydrochloric acid, followed by extraction with diethyl ether and evaporation of the ethereal solution thus obtained, 46.8 g. of a mixture of phenol, pyrocatechol and hydroquinone are isolated. The phenol is separated by steam distillation and the unentrained products are extracted with ether. After evaporation of the solvent, there are finally obtained 4.80 g. of a mixture of diphenols containing 2.9 g. of pyrocatechol and 1.9 g. of hydroquinone, i.e. a molar yield of diphenols of 30% calculated on the hydroperoxide employed.

EXAMPLE 21

Into an apparatus identical with that of Example 20 are introduced 403 g. of a 1.77% solution of cyclohexyl hydroperoxide in trimethylsilyloxybenzene (i.e. 7.15 g. of pure hydroperoxide, 0.0615 mole), and 70 cc. of methyl borate. The mixture is heated for 2 hours, 30 minutes at 125° C. while the methyl borate/methanol azeotrope is distilled, the temperature rising to 143° C. In the course of the heating, 35 cc. of methyl borate are added. The product is then cooled, the excess of methyl borate is driven off under the vacuum of a water-jet pump, and the excess of trimethylsilyloxybenzene 279 g. is distilled off by heating at 68–69° C. under a vacuum of 10 mm.

Hg. The reaction mass is subjected to a steam distillation to hydrolyse the boric esters, and the products are then extracted by the procedure described in the foregoing example. 1.33 g. of phenolic products containing pyrocatechol and hydroquinone are thus obtained.

We claim:
1. Process for the preparation of a phenol which comprises oxidizing an aromatic compound of the formula:

$$C_6H_5-R$$

wherein R is a member selected from the group consisting of hydrogen, halogen, lower alkyl, lower alkoxy, —OB(OC$_6$H$_5$)$_2$, and —OSi(lower alkyl)$_3$, at 50° to 180° C. with 1 to 30% by weight of the said aromatic compound, of an unsubstituted hydrocarbon hydroperoxide having from 4 to 10 carbon atoms, in the presence of a boron compound selected from the group consisting of boric anhydride, boric acid and lower alkyl orthoborates in a proportion of ⅔ to 20 boron atoms per molecule of hydroperoxide, hydrolyzing the borate ester of a phenol thus formed, and separating the phenol so produced.

2. Process according to claim 1 in which the weight of hydroperoxide is 1 to 10% of the weight of the aromatic compound.

3. Process according to claim 1 in which the oxidation is carried out in the presence of an amine selected from the group consisting of pyridine, piperazine, ethylamine, a butylamine, monolaurylamine, cyclohexylamine, piperidine, an ethanolamine, and diethylethanolamine.

4. Process according to claim 3 in which the amount of the said amine is 0.0001 to 0.2 mole per mole of hydroperoxide.

5. Process according to claim 3 in which the amount of the said amine is 0.001 to 0.05 mole per mole of hydroperoxide.

6. Process for the preparation of a phenol which comprises oxidizing an aromatic compound of the formula:

$$C_6H_5-R$$

where R is a member selected from the group consisting of hydrogen, halogen, lower alkyl, lower alkoxy, —OB(OC$_6$H$_5$)$_2$, and —OSi(lower alkyl)$_3$ at 50° to 180° C. with from 1 to 30% by weight of the said aromatic compound, of a hydroperoxide selected from the group consisting of benzyl hydroperoxide, cyclohexyl hydropreoxide, ethyl-benzene hydroperoxide, and cumene hydroperoxide in the presence of a boron compound selected from the group consisting of boric anhydride, boric acid, and lower alkyl orthoborates in an amount to provide ⅔ to 20 atoms of boron per molecule of hydroperoxide, hydrolysing the borate ester of a phenol thus formed, and separating the phenol so produced.

7. Process according to claim 6 in which the oxidation is effected in the presence of 0.0001 to 0.2 mole per mole of said hydroperoxide of an amine selected from the group consisting of pyridine, piperazine and triethylamine.

References Cited

UNITED STATES PATENTS 3,251,888   5/1966   Toland _____ 260—618

BERNARD HELFIN, *Primary Examiner.*

U.S. Cl. X.R.

260—586, 592, 599, 621, 623, 624, 631, 618